United States Patent [19]

Kelch et al.

[11] Patent Number: 4,683,531
[45] Date of Patent: Jul. 28, 1987

[54] POLLING METHOD FOR DATA PROCESSING SYSTEM

[75] Inventors: Russell K. Kelch, Senecaville; Don C. Finfrock, Cambridge; Donald J. Girard, Cambridge; Daniel B. Seevers, Cambridge; Barry D. Briggs, New Concord; Gene R. Mathes, Zanesville, all of Ohio

[73] Assignee: NCR Corporation, Dayton, Ohio

[21] Appl. No.: 627,253

[22] Filed: Jul. 2, 1984

[51] Int. Cl.⁴ .............................................. G06F 13/22
[52] U.S. Cl. .............................. 364/200; 340/825.08; 340/825.22
[58] Field of Search ............... 340/825.08, 825.22; 364/200 MS File, 900 MS File; 370/90

[56] References Cited

U.S. PATENT DOCUMENTS

| | | | |
|---|---|---|---|
| 3,652,993 | 3/1972 | Bridwell | 370/90 |
| 4,251,865 | 2/1981 | Moore et al. | 364/200 |
| 4,586,128 | 4/1986 | Dewoskin | 364/200 |

FOREIGN PATENT DOCUMENTS 0012502  6/1980  United Kingdom .

OTHER PUBLICATIONS

IBM Technical Disclosure Bulletin, vol. 20, nr. 2, Jul. 1977, New York, R. W. Farr et al., "Dynamically Optimized Polling System", pp. 773-774.

Primary Examiner—Archie E. Williams, Jr.
Assistant Examiner—Emily Yue Chan
Attorney, Agent, or Firm—Wilbert Hawk, Jr.; Richard W. Lavin

[57] ABSTRACT

A method for polling a plurality of remote processing units includes establishing a table of active and inactive remote processing units, sequentially polling each of the active processing units, at the conclusion of polling the active processing units, polling an inactive processing unit after which all of the active processing units are again polled. This sequence is repeated until all the active and inactive processing units have been polled. If in polling a processing unit, a response to the poll message indicates a change of status of the polled processing unit has occurred, the table is accordingly updated to reflect the current status of the processing unit.

5 Claims, 11 Drawing Figures

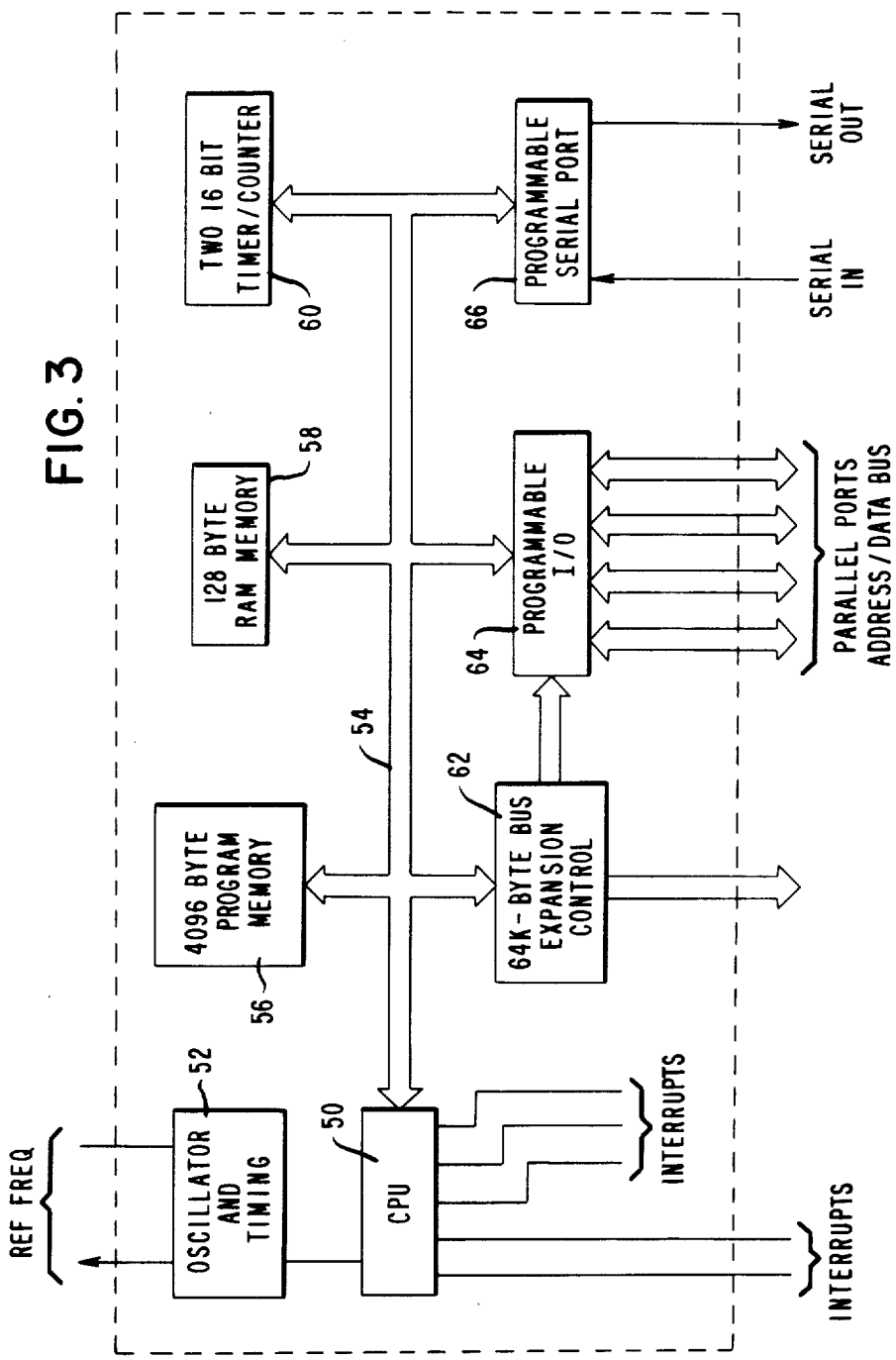

| DEVICE ADDRESS | | |
|---|---|---|
| 00 | 1 | |
| 01 | F | E |
| 02 | F | E |
| 03 | 0 | 0 |
| 04 | 0 | 0 |
| 05 | F | E |
| 06 | 0 | 0 |
| 07 | F | E |
| 08 | 0 | 0 |
| 09 | 0 | 0 |
| 0A | 0 | 0 |
| 0B | 0 | 0 |
| 0C | 0 | 0 |
| 0D | 0 | 0 |
| 0E | 0 | 0 |
| 0F | 0 | 0 |

IOM ADDRESS MASTER NEVER POLLED

—106

| MSG TYP | LN | MSG IDENT | DATA | BCL |

112 — MSG TYP
117 — DATA
114 — MSG IDENT 4,683,531

POLLING METHOD FOR DATA PROCESSING SYSTEM

BACKGROUND OF THE INVENTION

The present invention is directed to a data processing system which includes a central or master controlled processor and a number of remote processors and, more particularly, it relates to a method and apparatus for polling both active and inactive remote processors as part of the data processing system.

With the cost of microprocessor chips dropping, their use in relatively low-cost data processing systems are increasing. In modern data terminal devices, microprocessors are incorporated in keyboards, displays, printers, etc. These devices are associated with the functional operation of the terminal device. Terminals are used in some business environments which require that certain of the operating devices such as a printer, keyboard and display may be added to the terminal or removed from the terminal at various times during the day in accordance with business conditions. Prior polling systems such as taught by U.S. Pat. No. 3,766,530, U.S. Pat. No. 3,866,175 and U.S. Pat. No. 4,071,908 set up groups of active remote devices which are then polled by the master processor. But if other remote devices are added to the communication network or removed, the polling system is unable to pick up the change in the polling sequence. It is therefore a principal object of this invention to provide a polling sequence which detects the removal or the addition of a remote processing device from the communication network. It is a further object of this invention to provide a high-speed polling sequence of both active and inactive remote processing devices associated with a communication network.

SUMMARY OF THE INVENTION

These and other objects of the invention are fulfilled by providing a polling sequence in which a table of all the remote processing devices associated with a central processing device is set up for identifying each of the remote processing devices as being an active or inactive device. The central processing device will initiate a polling sequence by polling each of the active devices listed in the table. At the conclusion of polling all the active devices, the first inactive device listed on the table is polled after which all the active devices are again polled. At the conclusion of the polling of the active devices, the next inactive device in the table is polled. This sequence is repeated enabling the central processing device to poll all of the active/inactive devices in a very short time. If during the polling sequence, an active device becomes inactive or an inactive device becomes active, the polling of the devices using this polling system allows the central processor to make changes in the poll table at the time that such changes are found so that the polling of the devices will continue in the above-cited sequence.

BRIEF DESCRIPTION OF THE DRAWING

Additional advantages and features of the present invention will become apparent and fully understood from reading the following description, taken in conjunction with the annexed drawings, in which;

FIG. 3 is a functional block diagram of each of the microprocessor devices found in the data processing system;

DETAILED DESCRIPTION OF THE INVENTION

Figure 1:
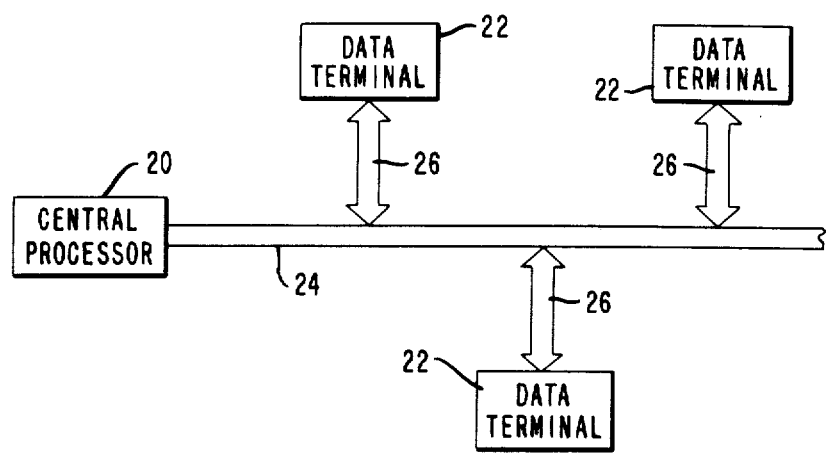
FIG. 1 is a schematic diagram of a multi-point data processing system including a central processor device connected to a plurality of data terminal devices in which the present invention may be used.
Figure 2:
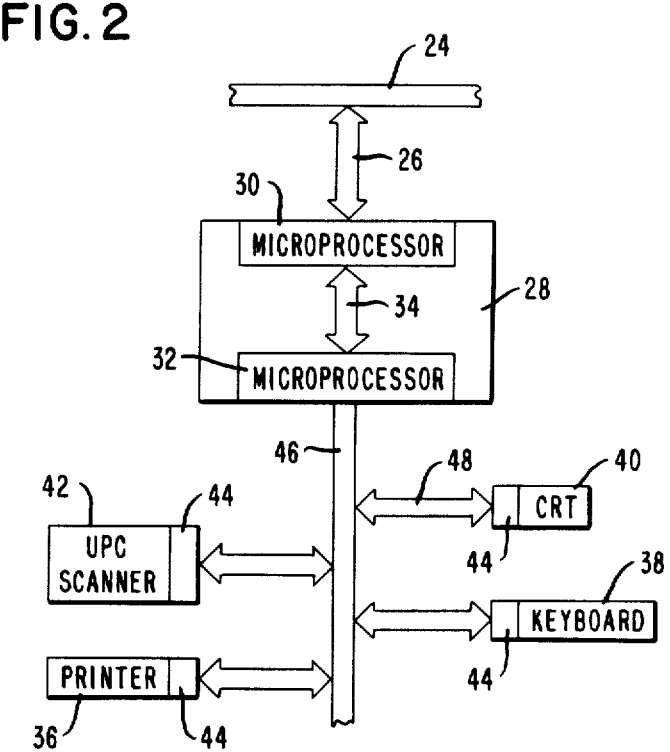
FIG. 2 is a schematic diagram of a communication bus of each of the data terminals of FIG. 1 showing the microprocessor device arrangement of the communication controller located therein.

Referring to FIG. 1, there is shown a schematic diagram of a typical multi-point data processing system forming a local area communication network which may include a central processor 20 and a plurality of data terminal devices 22 connected to the processor 20 by a serial communication bus 24 and a serial sub-system transfer bus 26 on which data is transmitted between the processor 20 and the terminal devices 22 in a manner that is well known in the art. As shown in FIG. 2, the data appearing on the serial buses 24 and 26 are inputted into a communication interface unit or controller 28 in each of the terminal devices 22. Included in the controller 28 are a pair of microprocessor devices 30, 32 interconnected by a serial communication bus 34. For a complete description of the communication network of the controller 28, reference should be made to the co-pending patent application "High Speed Data Transmission System" by Houser et al, Ser. No. 627,310, now U.S. Pat. No. 4,669,044 filed on even date and assigned to the NCR Corporation. As is well known in the art, the controller 28 functions to control the transmission of data between the central processor 20 and the various remote operating devices associated with the terminal device 22 such as a printer 36, a keyboard 38, a CRT display 40, and a UPC scanner 42. Associated with each of the operating devices is a microprocessor device 44 which functions in the same manner as microprocessors 30 and 32. The microprocessor device 30 controls the transmission of data between the controller 28 and the central processor 20 (FIG. 1), while the microprocessor device 32 controls the transmission of data over the serial bus 46 between the controller 28 and the microprocessor devices 44 associated with each of the operating devices 36–42 inclusive. The microprocessor devices 30, 32 and 44 referred to herein may comprise an Intel 8051 microprocessor chip which is commercially available from the Intel Corporation of Santa Clara, Calif. A description of the Intel 8051 microprocessor chip may be found in the publication "MCS-51 Family of Single Chip Microcomputer User's Manual" published by the Intel Corporation in July, 1981.

Referring now to FIG. 3, there is disclosed a functional block diagram of the microprocessor devices 30, 32 and 44. Included in each of the microprocessor devices is a central processing unit (CPU) 50 which is operated by clock signals from an oscillator and timing circuit 52 which in turn receives a reference frequency signal from an external clock (not shown). The processing unit 50 has access over data bus 54 to a 4,096 byte program memory block 56, a 128 byte RAM memory block 58, a two 16 bit timer/event counter block 60, a 64K byte bus expansion control block 62, a programmable I/O control block 64 and a programmable serial port block 66 for either microprocessor communications or I/O expansion.

Figure 4A:
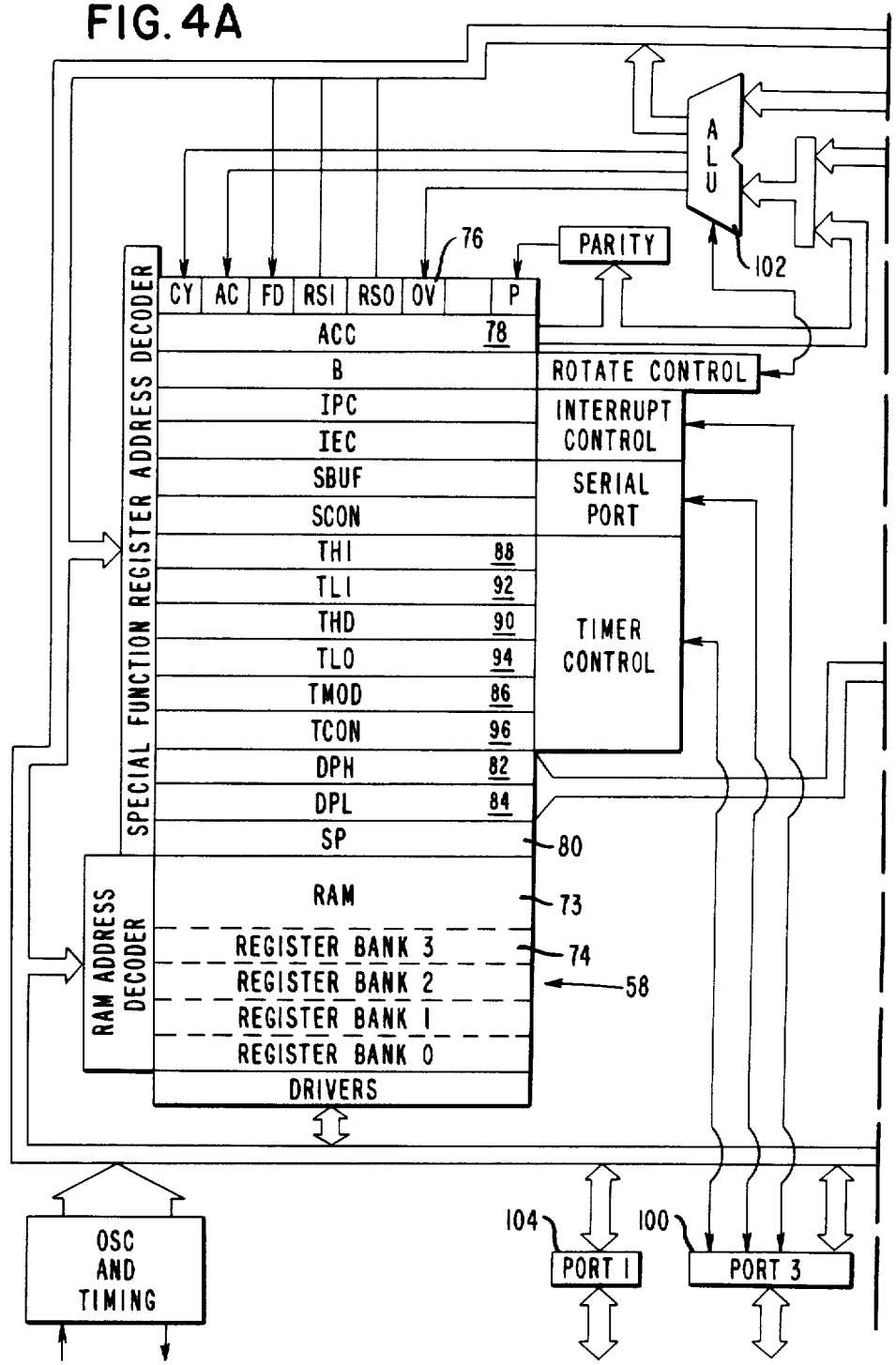
FIGS. 4A and 4B taken together disclose a detailed block diagram of the microprocessor device of FIG. 3.
Figure 4B:
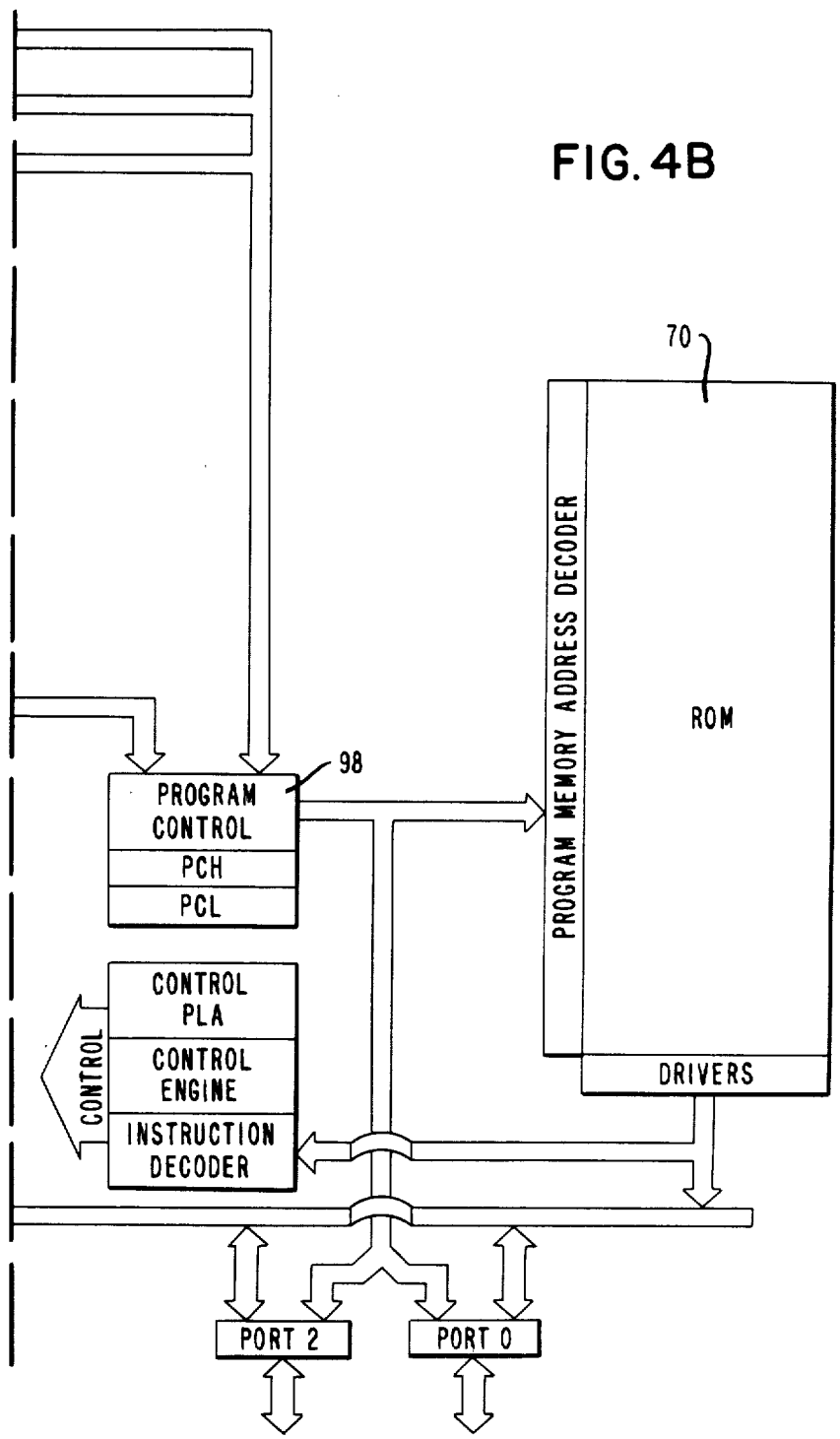

Referring now to FIGS. 4A and 4B taken together, there is shown a detailed block diagram of the microprocessor devices 30, 32 and 44. Included in each of the microprocessor devices is a 4K ×8 ROM memory unit 70 (FIG. 4B) for program storage, which may be internal or external to the microprocessor devices 30, 32 or 44, a 128 byte internal RAM memory unit generally indicated by the numeral 58 (FIG. 4A) which includes a general purpose register 73, four banks of eight 8-bit registers 74 and a plurality of special function registers 76. Included in the special function registers 76 (FIG. 4A) is an accumulator (ACC) 78, an 8-bit stack pointer register (SP) 80, a high-order data pointer (DPH) 82, a low-order data pointer (DPL) 84, a timer/counter mode register (TMOD) 86 in which are stored the data bits that select which operation each timer/counter will perform, four timer/counter registers (THI) 88, (THO) 90, (TLI) 92 and (TLO) 94, and a timer/control register (TCON) 96 for controlling the operation of the timer/counter registers 88-94 inclusive. Further included in the microprocessor device is a program control section 98 (FIG. 4B) which controls the sequence in which the instructions of the program stored in the ROM 70 are executed and an arithmetic/logic unit 102 (FIG. 4A) for performing arithmetic operation in a manner that is well known in the art. The microprocessor device includes four ports in which port zero 104 (FIG. 4A) is used for data transfer and port three 100 contains the transmit/receive lines connected between the microprocessor device 32 in the controller 28 and the remote microprocessor devices 44 associated with the operating devices of the terminal device 22.

Figure 5:
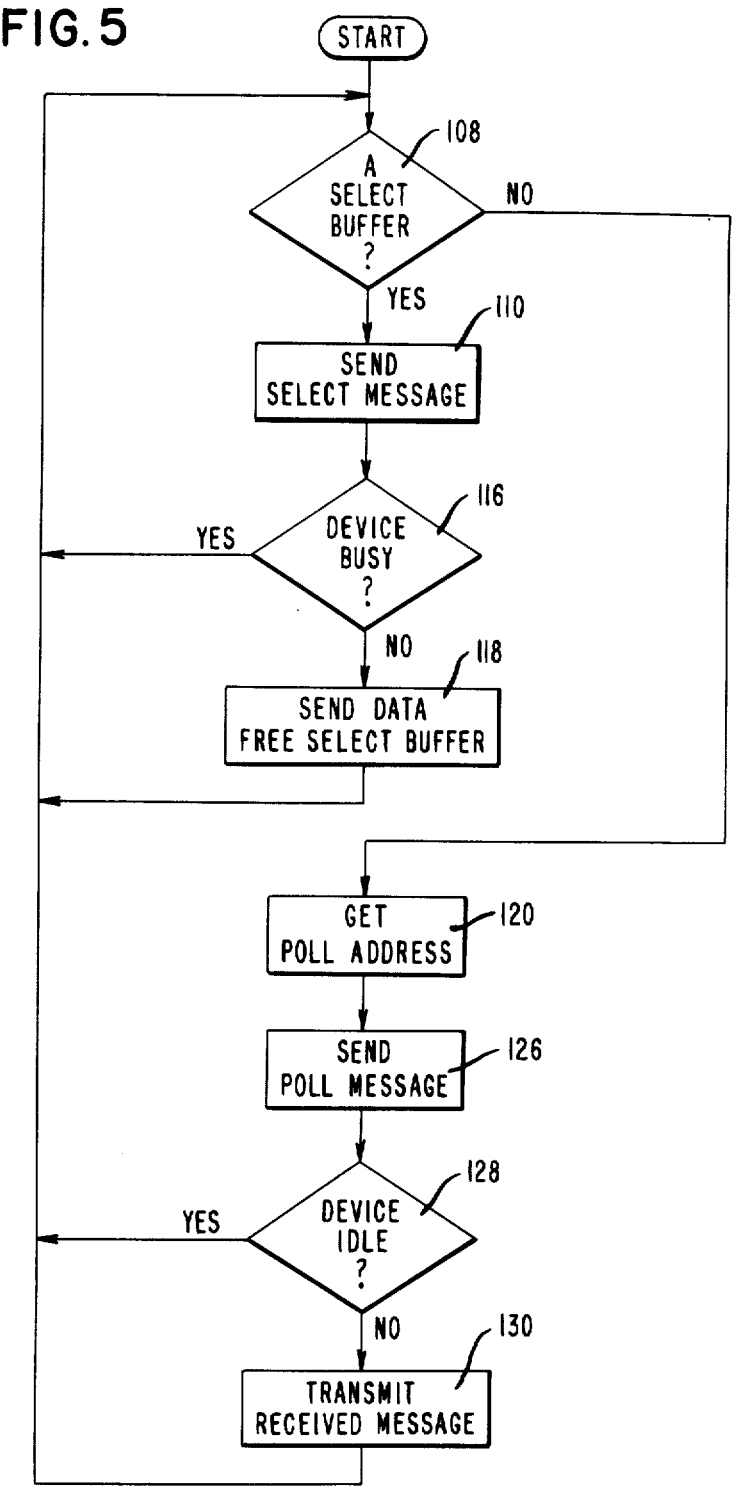
FIG. 5 is a flow chart of the overall polling sequence between the microprocessor device in the controller and the microprocessor devices in the various operating devices of the terminal device.

Referring now to FIG. 5, there is disclosed a flow chart of a polling sequence between the microprocessor device 32 (FIG. 2) and the microprocessor devices 44 each associated with one of the remote operating devices 36-42 inclusive. Prior to the start of a polling sequence, the microprocessor device 32 will have transmitted a status or configuration message to each of the microprocessor devices 44 associated with the devices 36-42 inclusive (FIG. 2). This occurs at power-up or when the system is reset. If a microprocessor device 44 is active, that is, is present and in an operating mode, the microprocessor device 32 will establish a poll table 106 (FIG. 9) in the RAM general purpose register 73 (FIG. 4A) in which the binary bits FE are stored at an address of a microprocessor device 44 which is present and active. If a device is inactive, the binary bits 00 are stored.

Figure 8:
FIG. 8 is a schematic diagram of the poll/select message.

If the microprocessor device 32 attempts to poll but fails to communicate with a microprocessor device 44, the binary bits FF are stored in the table. The microprocessor device 32 will again try to poll the device. If after two failures in a row to reach the device, the binary bits 00 are stored in the table 106. If a polled microprocessor device 44 responds after the first re-try operation, the binary bits FE are stored in the table. After establishing the table 106, the microprocessor device 32 will check (block 108) (FIG. 5) for a select buffer (not shown) to see if any data has been received from the central processor 20 which is to be transmitted to an active microprocessor device 44 listed in the table 106. The select buffer is located in an external RAM memory unit connected to the microprocessor device 32. If the buffer contains data, the program stored in the ROM memory unit 70 (FIG. 4B) will send (block 110) a select message 115 (FIG. 8) to see if the microprocessor device 44 is available to receive a message. The construction of the message 115 (FIG. 8) is the same for either a poll or select message with the code 02 representing a poll message and 04 representing a select message. The program will check (block 116) if the device is busy in accordance with the response message received from the polled device. If the polled microprocessor device 44 is busy, the program will again check the select buffers to see if there is any data to be transmitted to a listed active device. If the device is not busy, the microprocessor device 32 will send a data message 112 (FIG. 10) to the microprocessor device 44 (block 118) which includes a four byte message identification field 114 and at least one byte data field 117, free the select buffer to receive further data from the remote processor 20 and check to see if further data has been received and stored in the select buffer.

If no further data has been received from the control processor 20, the program will start polling the microprocessor devices 44 by going to the poll table 106 (FIG. 9) and retrieve (block 120) (FIGS. 5 and 6) the poll address of the first microprocessor device 44 listed in the table. The program will check (block 122) (FIG. 6) to see if the device is an active device. If it is, the program will exit (block 124) (FIG. 6) this sequence and send (block 126) (FIG. 5) the poll message 115 (FIG. 8) to the active device asking if the device has any data to be sent to the remote processor 20. If at the time of polling, the polled device has no data to send to the remote processor 20 (FIG. 1) indicated by transmitting an idle message (block 128) to the microprocessor device 32 (FIG. 5), the program will loop back and again start the polling sequence by checking (block 108) to see if there is a select buffer containing data to be transmitted to one of the active devices.

Figures 9, 10:
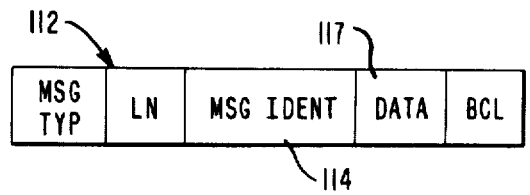
FIG. 9 is a schematic diagram of the poll table stored in the RAM memory unit of the controller microprocessor device.
FIG. 10 is a schematic diagram of an address message transmitted between the mircroprocessor device of the controller and the microprocessor devices of the operating devices of the terminal device.

If the microprocessor device 32 receives a message for the central processor 20 in response to its poll message, the program will transmit (block 130) (FIG. 5) the received message from the active device to the central processor 20 and again check (block 108) to see if there is a select buffer present. The program will continue polling the active devices (block 122) (FIG. 6) until the pointer in one of the registers 74 in the RAM memory unit 58 (FIG. 4A) points to a device address in the general purpose register 73 which is not active. The program will check (block 136) (FIG. 6) to see if it is the last active device listed in the poll table 106 (FIG. 9). If it is not, the program will get the next active device address (block 120) in the poll table. If the device is the last active device in the poll table 106, the program will poll (block 138) the address of the next inactive device after polling the last active device.

In polling an inactive microprocessor device, the program will start (block 140) (FIG. 7) by sending the poll message 115 (FIG. 8) (block 142) and start (block 144) a 256 msec timer (not shown). The program will then check for a response (block 146) to the poll message. If it fails to get a response before the 256 msec timer times out, it will check (block 148) if the time out is the first time out. If it is the first time out, it will repeat sending the poll message (block 142). If no response is received before the second time out, the program will check (block 150) to see if the polled device is an active device. If it is not, it will exit (block 152) back into the polling sequence. If the device is an active device, the program will update the poll table 106 (FIG. 9) by replacing the code designation FE with 00. If the polled device responds (block 146) within the first or second time out, the program will check the identity of the device (block 156). If it is an active device, it will exit (block 152) back into the polling sequence. If it is an inactive device, it will update the poll table 106 by replacing the code designation 00 with FE. Upon returning to the polling sequence, the program will check (block 158) (FIG. 6) to see if it is at the end of the poll table. If it is not, it will repeat the polling sequence of the active devices (FIGS. 5 and 6).

When the program reaches the end of the poll table 106 after polling the last inactive microprocessor device 44, it will start a timing sequence in counters 88 through 92 (FIG. 4A) inclusive to produce a 15 millisecond time-out. This time period allows the active operating devices of the terminal device 22 such as a keyboard to complete its operating cycle which may produce data required for transmission to the remote processor 20. After checking (block 160) (FIG. 6) for the presence of a time-out, and finding that a time-out has occurred, the program will restart the timer (block 162) and start again polling the table 106 of active devices and the next inactive device. This process will continue until all of the active and inactive microprocessor devices 44 have been polled.

Figure 6:
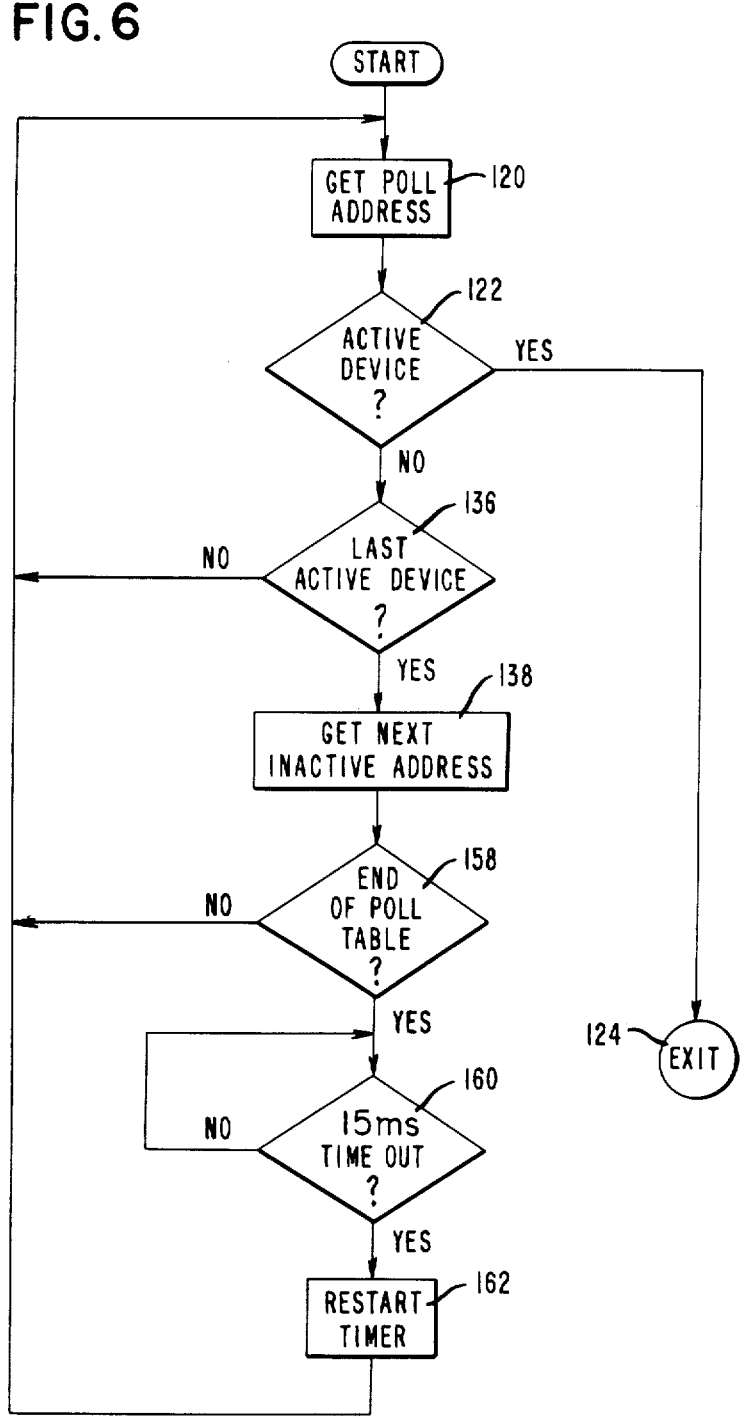
FIG. 6 is a detailed flow chart for the polling sequence step of FIG. 5 in which the acitve/inactive microprocessor devices are polled.
Figure 7:
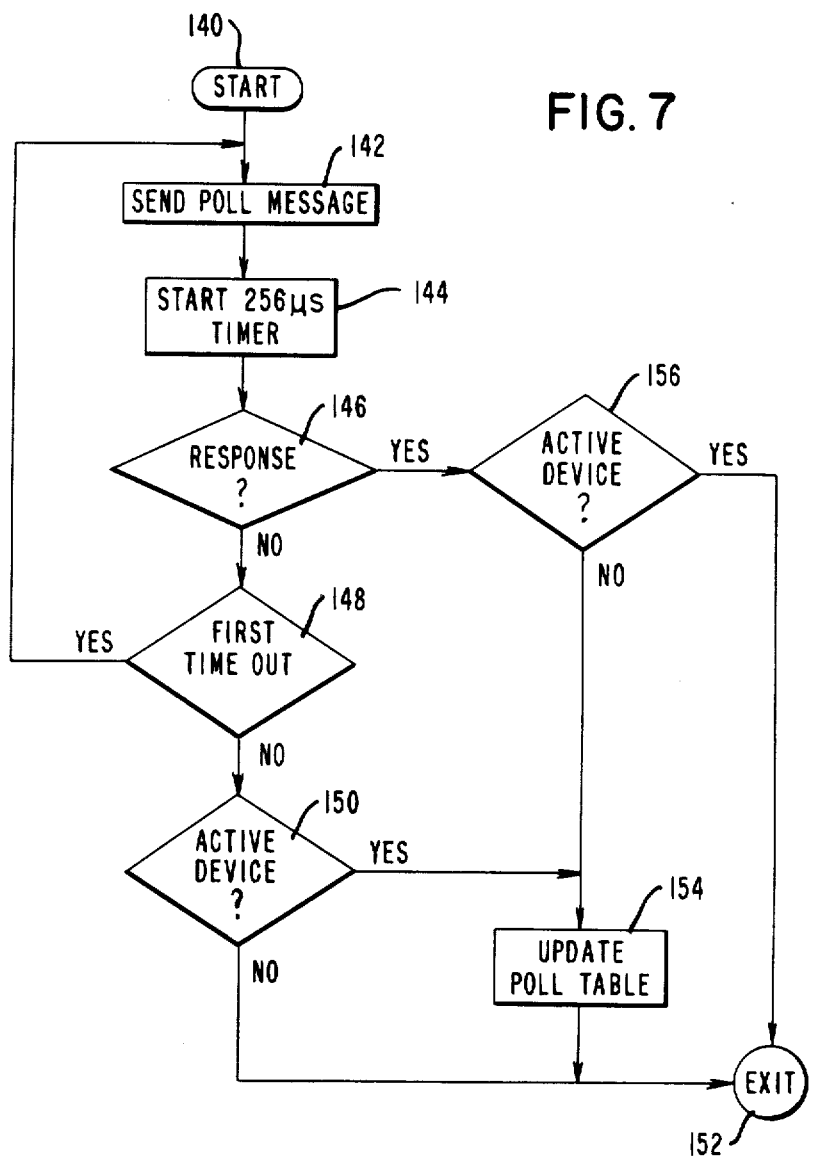
FIG. 7 is a detailed flow chart for the polling sequence of the last active/inactive microprocessor device.

The following comprises a detailed program listing for the polling sequence shown in FIGS. 5, 6 and 7. The actual machine codes and instructions shown relate to the Intel 8051 microprocessor chip in the embodiment described, however the techniques employed herein may be extended to other processors. Definition of the various machine codes and instructions may be obtained from, for example, the publication entitled "8051 User Manual," which was published by Intel Corporation in 1982.

| LOCA-TION | OBJECT | LINE | SOURCE | |
|---|---|---|---|---|
| | | 300 | POLL_LOOP: | |
| 0082 | 758DC5 | 301 | MOV | TH1,#0C5H |
| 0085 | 758B68 | 302 | MOV | TL1,#068H |
| 0088 | D20A | 303 | SETB | POLL_TIME |
| 008A | 32 | 304 | RETI | |
| | | 305 | | |
| | | 306 | WAIT_NR: | |
| | | 659 | CT6: | |
| 02D7 | 201405 | 660 | JB | POLL_TOG,CT7 |
| 02DA | D214 | 661 | SETB | POLL_TOG |
| 02DC | 02048C | 662 | JMP | SEL_CHECK |
| | | 663 | CT7: | |

-continued

| LOCA-TION | OBJECT | LINE | SOURCE | |
|---|---|---|---|---|
| 02DF | 020584 | 664 | JMP | POL_CHECK |
| | | 665 | | |
| | | 666 | | |
| | | 1106 | ; POLL 10E FOR INPUT | |
| | | 1107 | | |
| | | 1108 | POL_CHECK: | |
| 0584 | 753205 | 1109 | MOV | STAT_TYPE,#POL_STAT |
| 0587 | 12081A | 1110 | CALL | STAT_CK |
| 058A | 700E | 1111 | JNZ | PCO |
| 058C | 12082A | 1112 | CALL | GET_BUFF |
| 058F | 7005 | 1113 | JNZ | PCO_5 |
| 0591 | D215 | 1114 | SETB | POLL_ZERO |
| 0593 | 0205A5 | 1115 | JMP | PCO_1 |
| | | 1116 | PCO_5: | |
| 0596 | 7605 | 1117 | MOV | @R0,#POL_STAT |
| 0598 | F537 | 1118 | MOVI | POL_/T,A |
| | | 1119 | PCO: | |
| 059A | 300F08 | 1120 | JNB | DIAG_REQ_FLG,PCO_1 |
| 059D | D20D | 1121 | SETB | DIAG_IN_PRG |
| 059F | 85302E | 1122 | MOV | UA,DIAG_ A |
| 05A2 | 0205AE | 1123 | JMP | ·PC_1 |
| | | 1124 | PCO_1: | |
| 05A5 | 12086B | 1125 | CALL | GET_POLL_ID |
| 05A8 | 7004 | 1126 | JNZ | PC_1 |
| 05AA | D214 | 1127 | SETB | POLL_TOG |
| 05AC | 41A2 | 1128 | JMP | START_CK |
| | | 1129 | PC_1: | |
| 005AE | C207 | 1130 | CLR | IDL_FLAG |
| 05B0 | C200 | 1131 | CLR | SECOND_TRY |
| | | 1132 | SEND_POLL: | |
| 05B2 | D206 | 1133 | SETB | POL_IN_PRG |
| 05B4 | C207 | 1134 | CLR | IDL_FLAG |
| C5B6 | C201 | 1135 | CLR | IDL_LINE |
| 05B8 | C204 | 1136 | CLR | NO_RESP |
| 05BA | C202 | 1137 | CLR | BCC_ERR |
| 05BC | C209 | 1138 | CLR | MSG_IN |
| 05BE | 1205C5 | 1139 | CALL | POLL_SETUP |
| 05C1 | 41A2 | 1140 | JMP | START_CK |
| | | 1141 | | |
| | | 1142 | WAIT_NR_JMP1: | |
| C5C3 | 018B | 1143 | JMP | WAIT_NR |
| | | 1144 | | |
| | | 1145 | POLL_SETUP: | |
| 05C5 | C2AF | 1146 | CLR | EA |
| 05C7 | C0D0 | 1147 | PUSH | PSW |
| 05C9 | 75D018 | 1148 | MOV | PSW,#18H |
| 05CC | C582 | 1149 | XCH | A,DPL |
| 05CE | CB | 1150 | XCH | A,R3 |
| 05CF | C583 | 1151 | XCH | A,DPH |
| 05D1 | CC | 1152 | XCH | A,R4 |
| 05D2 | 7452 | 1153 | MOV | A,#STACK2 |
| 05D4 | C581 | 1154 | XCH | A,SP |
| 05D6 | CD | 1155 | XCH | A,R5 |
| 05D7 | C29C | 1156 | CLR | REN |
| 05D9 | C297 | 1157 | CLR | TEN |
| 05DB | E4 | 1158 | CLR | A |
| 05DC | 10150A | 1159 | JBC | POLL_ZERO,PS_0 |
| 05E1 | 853783 | 1161 | MOV | DPH,POL_PT |
| 05E4 | 758200 | 1162 | MOV | DPL,#00 |
| 05E7 | BUFFER | 1163 | MOVX | @DPTR,A |
| 05E8 | A3 | 1164 | INC | DPTR |
| | | 1165 | PS_0: | |
| 05E9 | 20D002 | 1166 | JB | P,POLL_RO |
| 05EC | D2E7 | 1167 | SETB | ACC.7 |
| | | 1168 | POLL_RO: | |
| 05EE | D29B | 1169 | SETB | TB8 |
| 05F0 | F599 | 1170 | MOV | SBUF,A |
| 05F2 | 1140 | 1171 | CALL | SETUP_EXIT |
| 05F4 | C299 | 1172 | CLR | TI |
| 05F6 | C29B | 1173 | CLR | TB8 |
| 05F8 | 300F06 | 1174 | JNB | DIAG_REQ_FLG,POL_RO_1 |
| 05FB | 759915 | 1175 | MOV | SBUF,#DIAG |
| 05FE | 020604 | 1176 | JMP | POL_RO_2 |
| | | 1177 | POL_RO_1: | |
| 0601 | 759902 | 1178 | MOV | SBUF,#POL |
| | | 1179 | POL_RO_2: | |

-continued

| LOCATION | OBJECT | LINE | SOURCE | |
|---|---|---|---|---|
| 0604 | 1133 | 1180 | CALL | SER_EXIT |
| 0606 | C299 | 1181 | CLR | TI |
| 0608 | D297 | 1182 | SETB | TEN |
| 060A | D29C | 1183 | SETB | REN |
| 060C | 758A00 | 1184 | MOV | TL0,#00 |
| 060F | 758C0 | 1185 | MOV | TH0,#01 |
| 0612 | 75419F | 1186 | MOV | TOUT_LOW,#LOW POL_NR |
| 0615 | 754006 | 1187 | MOV | TOUT_HIGH, #HIGH POL_NR |
| 0618 | D28C | 1188 | SETB | TR0 |
| 061A | 1133 | 1189 | CALL | SER_EXIT |
| 061C | C298 | 1190 | CLR | R |
| 061E | 758A00 | 1191 | MOV | TL0,#00 |
| 0621 | C28D | 1192 | CLR | TF0 |
| 0623 | E599 | 1193 | MOV | A,SBUF |
| 0625 | B43D0A | 1194 | CJNE | A,#IDL,POL_R1 |
| 0628 | C28C | 1195 | CLR | TR0 |
| 062A | F0 | 1196 | MOVX | @DPTR,A |
| 062B | A3 | 1197 | INC | DPTR |
| 062C | D209 | 1198 | SETB | MSO_IN |
| 062E | 1133 | 1199 | CALL | SER_EXIT |
| 0630 | 11A7 | 1200 | CALL | ERROR_INT |
|  |  | 1201 | POL_R1: |  |
| 0632 | F0 | 1202 | MOVX | @DPTR,A |
| 0633 | A3 | 1203 | INC | DPTR |
| 063 | 1133 | 1204 | CALL | SER_EXIT |
| 0636 | C298 | 1205 | CLR | RI |
| 0638 | 758A00 | 1206 | MOV | TL0,#00 |
| 063B | C28D | 1207 | CLR | TF0 |
| 063D | E599 | 1208 | MOV | A,SBUF |
| 063F | FE | 1209 | MOV | R6,A |
| 0640 | F0 | 1210 | MOVX | @DPTR,A |
| 0641 | A3 | 1211 | INC | DPTR |
| 0642 | F542 | 1212 | MOV | SUMCK,A |
| 0644 | 1133 | 1213 | CALL | SER_EXIT |
| 0646 | C298 | 1214 | CLR | RI |
| 0648 | 758A00 | 1215 | MOV | TL0,#00 |
| 064B | C28D | 1216 | CLR | TF0 |
| 064D | E599 | 1217 | MOV | A,SBUF |
| 064F | FF | 1218 | MOV | R7,A |
| 0650 | F0 | 1219 | MOVX | @DPTR,A |
| 0651 | A3 | 1220 | INC | DPTR |
| 0652 | 2542 | 1221 | ADD | A,SUMCK |
| 0654 | F542 | 1222 | MOV | SUMCK,A |
|  |  | 1223 | POL_R4: |  |
| 0656 | 1133 | 1224 | CALL | SER_EXIT |
| 0658 | C298 | 1225 | CLR | RI |
| 065A | 758A00 | 1226 | MOV | TL0,#00 |
| 065D | C28D | 1227 | CLR | F0 |
| 065F | E599 | 1228 | MOV | A,SBUF |
| 0661 | 2542 | 1229 | ADD | A,SUMCK |
| 0663 | F542 | 1230 | MOV | SUMCK,A |
| 0665 | E599 | 1231 | MOV | A,SBUF |
| 0667 | F0 | 1232 | MOVX | @DPTR,A |
| 0668 | A3 | 1233 | INC | DPTR |
| 0669 | E582 | 1234 | MOV | A,DPL |
| 066B | 7006 | 1235 | JNZ | POL_R5 |
| 066D | 1582 | 1236 | DEC | DPL |
| 066F | 1583 | 1237 | DEC | DPH |
| 0671 | D203 | 1238 | SETB | BUFF_FULL |
|  |  | 1239 | POL_R5: |  |
| 0673 | DFE1 | 1240 | DJNZ | R7,POL_R4 |
| 0675 | 1133 | 1241 | CALL | SER_EXIT |
| 0677 | C298 | 1242 | CLR | RI |
| 0679 | C28C | 1243 | CLR | TR0 |
| 067B | C28D | 1244 | CLR | TF0 |
| 067D | E599 | 1245 | MOV | A,SBUF |
| 067F | F0 | 1246 | MOVX | @DPTR,A |
| 0680 | 2542 | 1247 | ADD | A,SUMCK |
| 0682 | 6004 | 1248 | JZ | POL_R7 |
| 0684 | D202 | 1249 | SETB | BCC_ERR |
| 0686 | 018B | 1250 | JMP | WAIT_NR |
|  |  | 1251 |  |  |
|  |  | 1252 | POL_R7: |  |
| 0688 | C29C | 1253 | CLR | REN |
| 068A | C297 | 1254 | CLR | TEN |
| 068C | 75990E | 1255 | MOV | SBUF,#ACK |
| 068F | 1133 | 1256 | CALL | SER_EXIT |
| 0691 | C299 | 1257 | CLR | TI |
| 0693 | C28C | 1258 | CLR | TR0 |
| 0695 | D297 | 1259 | SETB | TEN |
| 0697 | D29C | 1260 | SETB | REN |
| 0699 | D209 | 1261 | SETB | MSG_IN |
| 069B | 1133 | 1262 | CALL | SER_EXIT |
| 069D | 11A7 | 1263 | CALL | ERROR_INT |
|  |  | 1264 |  |  |
|  |  | 1265 |  |  |
|  |  | 1266 | POL_NR: |  |
| 069F | D204 | 1267 | SETB | NO_RESP |
| 06A1 | D209 | 1268 | SETB | MSG_IN |
| 06A3 | C28C | 1269 | CLR | TR0 |
| 06A5 | 1133 | 1270 | CALL | SER_EXIT |
| 06A7 | 11A7 | 1271 | CALL | ERROR_INT |
|  |  | 1272 | $EJECT |  |
|  |  | 1283 |  |  |
|  |  | 1284 | CK_POLL_CMP: |  |
| 06A9 | 200C02 | 1285 | JB | POL_IN_PRG, CPC_1 |
| 06AC | 41A2 | 1286 | JMP | START_CK |
|  |  | 1287 | CPC_1: |  |
| 06AE | 200123 | 1288 | JB | IDL_LINE, POLL_ERR |
| 06B1 | 200420 | 1289 | JB | NO_RESP, POLL_ERR |
| 06B4 | 20021D | 1290 | JB | BCC_ERR, POLL_ERR |
|  |  | 1291 | POLL_GOOD: |  |
| 06B7 | 1208BD | 1292 | CALL | UA_TO_POL |
| 06BA | 853783 | 1293 | MOV | DPH,POL_PT |
| 06BD | 758201 | 1294 | MOV | DPL,#01 |
| 06C0 | E0 | 1295 | MOVX | A,@DPTR |
| 06C1 | B43D0D | 1296 | CJNE | A,#IDL, P_MSG_1 |
| 06C4 | 30051A | 1297 | JNB | NEW_UA, POLL_EXIT |
| 06CC | 1209E9 | 1300 | CALL | CNF_SETUP |
| 06CF | 41A2 | 1301 | JMP | START_CK |
|  |  | 1302 | P_MSG_1: |  |
| 06D1 | 0206F0 | 1303 | JMP | POLL_PROCESS |
|  |  | 1304 |  |  |
|  |  | 1305 | POLL_ERR: |  |
| 06D4 | 200004 | 1306 | JB | SECOND_TRY, P_ERR1 |
| 06D7 | D200 | 1307 | SETB | SECOND_TRY |
| 06D9 | A1B2 | 1308 | JMP | SEND_POLL |
|  |  | 1309 | P_ERR1: |  |
| 06DB | 200503 | 1310 | JB | NEW_UA, POLL_EXIT |
| 06DE | 120809 | 1311 | CALL | UA_ERR |
|  |  | 1312 | POLL_EXIT: |  |
| 06E1 | 300D04 | 1313 | JNB | DIAG_IN_PRG, P_EX_1 |
| 06E4 | C20D | 1314 | CLR | DIAG_IN_PRG |
| 06E6 | C20F | 1315 | CLR | DIAG_REQ_FLG |
|  |  | 1316 | P_EX_1: |  |
| 06E8 | D207 | 1317 | SETB | IDL_FLAG |
| 06EA | C20C | 1318 | CLR | POL_IN_PRG |
| 06EC | C205 | 1319 | CLR | NEW_UA |
| 06EE | 41A2 | 1320 | JMP | START_CK |
|  |  | 1321 | $EJECT |  |

While the invention has been described in detail and with reference to specific embodiments thereof, it will be understood by those skilled in the art that various changes and modifications can be made therein without departing from the spirit and scope of the invention. For example, the RAM memory unit 58 (FIG. 4A) and the ROM memory unit 70 (FIG. 4B) may be either internal or external or both to the microprocessor devices 30, 32 or 44. Therefore, it is to be understood that the present invention is not to be limited beyond that as required by the appended claims.

We claim:

1. A method for polling during a processing operation a plurality of active and inactive remote processing units interconnected in a communication network with a master processing unit having a memory comprising the steps of:

(a) sequentially transmitting a status message from the master processing unit to each of the remote processing units prior to the start of the processing operation;

(b) transmitting a response message to the master processing unit from a remote processing unit that is active in response to receiving the status message;

(c) establishing in the memory a table of first and second bytes of binary signals in accordance with the response received to the status message in which each first byte of binary signals represents an active remote processing unit that has transmitted a response message to the master processing unit and each second byte of binary signals represents an inactive remote processing unit in the communication network that has not transmitted a response message to the master processing unit;

(d) sequentially transmitting a polling message to each active remote processing unit in the order listed in the table;

(e) at the conclusion of transmitting a polling message to the last active remote processing unit listed in the table, transmitting a polling message to the first inactive remote processing unit listed in the table;

(f) after transmitting a polling message to the first inactive remote processing unit, repeating step (d);

(g) at the conclusion of transmitting a polling message to the last active remote processing unit listed in the table, transmitting a polling message to the next inactive remote processing unit listed in the table;

(h) repeating steps (d), (e), (f) and (g) until all of the active and inactive remote processing units listed in the table have been polled;

(i) generating first and second time-out periods by the master processing unit at the start of transmitting a polling word to an inactive processing unit;

(j) storing a third byte of binary signals in the poll table representing the inactive device polled if the inactive device does not respond within the first time-out period; and (k) changing the third byte of binary signals representing the inactive processing unit polled to said first byte of binary signals upon receiving a response message from the inactive processing unit polled to the transmission of the polling word within said second time-out period.

2. The method of claim 1 which further includes the steps of generating said first and second time-out periods by the master processing unit at the start of transmitting a polling word to an active processing unit;

storing said third byte of binary signals in the poll table if the active device does not respond within the first time-out period;

and changing the third byte of binary signals representing the active processing unit polled to said second byte of binary signals representing an inactive processing device upon not receiving the response to the transmission of the polling message within the second time-out period.

3. The method of claim 1 which further includes the steps of generating a third time-out period by the master processing unit after all of the active and inactive remote processing units listed in the table have been polled;

checking to see if the third time-out period has elapsed;

and repeating the polling of the active and inactive remote processing units listed in the table upon finding the third time-out period has elapsed.

4. The method of claim 1 in which said first byte of binary signals is FE and said third byte of binary signals is FF.

5. The method of claim 4 in which the second byte of binary signals is 00.

* * * * *